United States Patent [19]

Rodrigo

[11] Patent Number: 5,199,246
[45] Date of Patent: Apr. 6, 1993

[54] ELECTROSTATIC METHOD AND APPARATUS FOR OPENING LINERS WITHIN CONTAINERS

[75] Inventor: Richard D. Rodrigo, Line Lexington, Pa.

[73] Assignee: Illinois Tool Works Inc., Glenview, Ill.

[21] Appl. No.: 941,796

[22] Filed: Sep. 8, 1992

[51] Int. Cl.⁵ .................. B31B 7/00; B65B 43/26; B65B 61/00
[52] U.S. Cl. ......................... 53/449; 53/457; 53/459; 53/175; 53/384.1; 53/141; 156/273.1; 493/100
[58] Field of Search ............... 53/175, 141, 457, 459, 53/384.1, 410, 449, 457; 493/100, 101, 93, 933; 156/273.1, 273.9, 274.4, 274.6, 380.2, 380.5

[56] References Cited

U.S. PATENT DOCUMENTS

| | | | |
|---|---|---|---|
| 2,328,798 | 9/1943 | Gardner | 53/175 X |
| 2,815,621 | 12/1957 | Carter | 493/101 X |
| 3,448,000 | 6/1969 | Paquin et al. | 156/274.6 X |
| 3,462,909 | 8/1941 | Anderson | 53/141 X |
| 4,089,255 | 5/1978 | Akoh et al. | 53/175 X |
| 4,419,855 | 12/1983 | Shanklin | 156/273.1 X |
| 4,824,425 | 4/1989 | Stock | 156/273.1 X |
| 4,945,709 | 8/1990 | Cerf | 53/141 X |
| 5,116,444 | 5/1992 | Fox | 156/273.1 X |

Primary Examiner—Horace M. Culver
Attorney, Agent, or Firm—Stanley Bilker

[57] ABSTRACT

Electrostatic method and apparatus for opening liners within containers and maintaining such liners in spread apart disposition preparatory to filling comprises (1) A.C. electrostatic ionizing means for directing a stream of bipolar air ions toward the outer walls of the containers substantially symmetrical therewith, and (2) D.C. electrostatic charging means for directing an ion wind of a single polarity toward the interior of liners within the containers whereby the liners and the containers will be charged to opposite polarities to cause electrostatic pinning of the liners to the interior of the containers and effect opening thereof while the net charge on the package is substantially neutral. Subsequent to opening, the spread apart liners in the containers may be easily filled with the appropriate material.

8 Claims, 2 Drawing Sheets

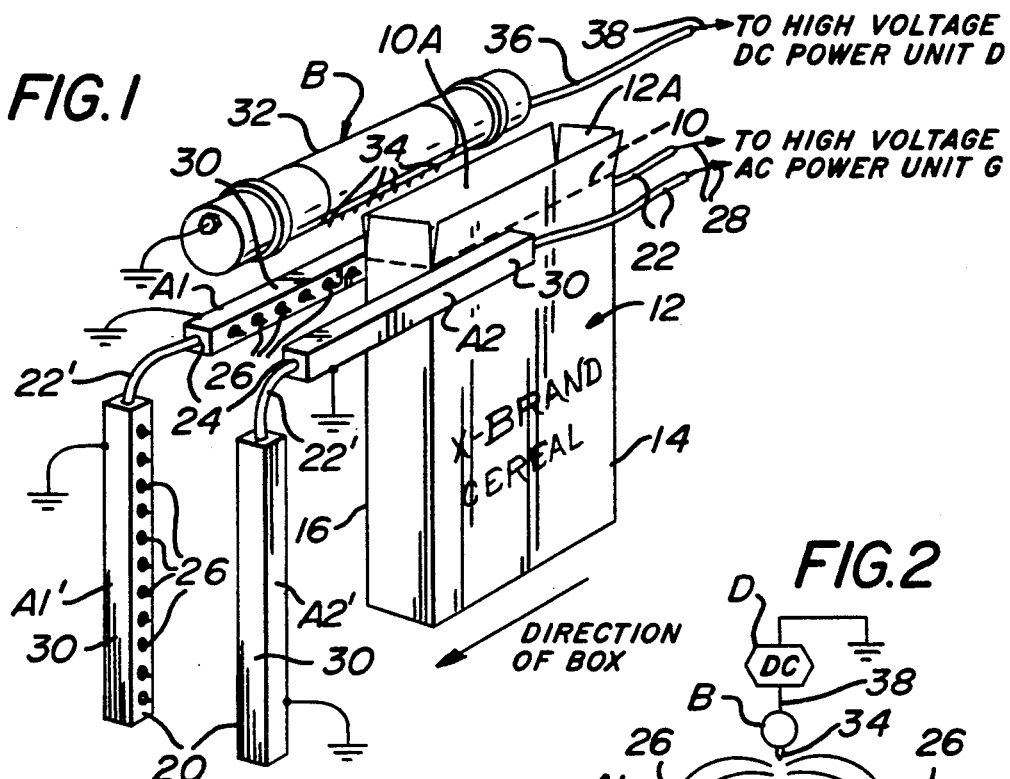
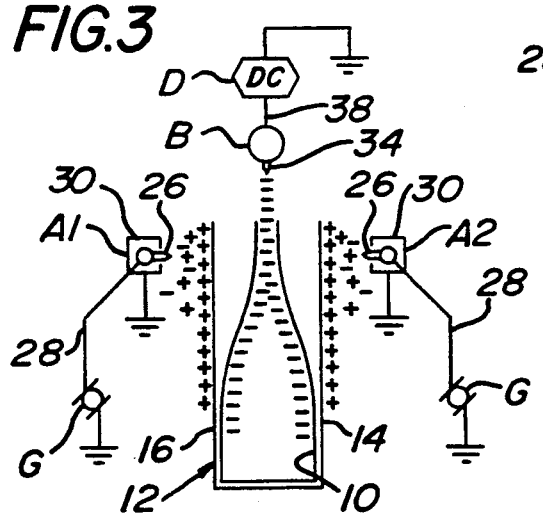
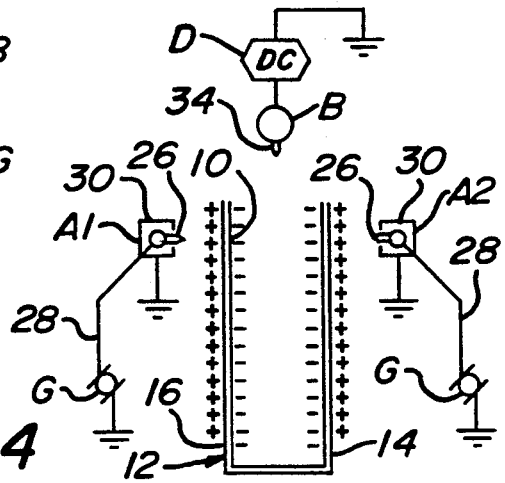

OUTPUT VOLTAGES
POWER SUPPLIES IN PHASE

OUTPUT VOLTAGES
POWER SUPPLIES OUT OF PHASE

ELECTROSTATIC METHOD AND APPARATUS FOR OPENING LINERS WITHIN CONTAINERS

BACKGROUND OF THE INVENTION

1. Field of the Invention

This invention relates to electrostatic pinning, and more particularly relates to an electrostatic apparatus and method for opening flexible liner bags within containers and maintaining such liners in spread apart disposition prior to filling with material.

The apparatus and method of the present invention is especially concerned with A.C. electrostatic ionizing means for directing a stream of bipolar air ions toward the outer walls of a container and D.C. electrostatic charging means for directing an ion wind of a single polarity toward the interior of the liner positioned within the container in spread apart disposition. The liner and the container will become charged to opposite polarities causing electrostatic pinning of the open liner to the interior walls of the container while the net charge on the liner-container package remains essentially neutral, thereby enabling the liner to be easily filled with its intended material.

2. Prior Art

In U.S. Pat. No. 4,657,151 and U.S. Pat. No. 4,558,792 to Cabernich, there are shown semi-rigid outer shells encapsulating coextensive inner liners weakly adhered thereto for the purpose of use as a nipple or nursing containers for feeding nipples.

In U.S. Pat. No. 3,892,614 (Levy), there is shown and described electrostatic laminating apparatus in which two or more sheets or articles to be pinned together are passed in close proximity or in contact with each other through an electric field. The field includes a first ionizing device for impinging unipolar ions of a particular polarity toward one side of the adjacent sheets while simultaneously directing ions of both polarities toward the other side of the sandwich. Although charges of opposite polarity appear on abutting surfaces of the sandwich, the resultant net charge on the electrostatically pinned laminate is neutral.

U.S. Pat. No. 3,844,657 (Schweriner) shows and describes a contact printing apparatus in which a laminar flow A.C. ionized air stream is directed over a sandwich of sheets (such as a negative and positive printing paper) resting flat on a surface while a D.C. generator is coupled to the surface to hold down the photosensitive film and negative to each other preparatory to exposure to light.

3. Objectives of the Invention

The present invention is especially useful for opening of flexible liners in containers, such as boxes or cartons, and maintain these liner bags in open disposition prior to filling. A typical application for spreading apart and holding such flexible liner bags open is in connection with filling operations of the food industry, for example in loading a box of dry cereal, crackers, cake mixes and snacks. It is important for the liner bag to be open when the liner bag is being loaded by the filling machine—otherwise the fill will not enter the bag with the consequent result that a misfill will occur with packaging rejection.

Existing processes depend upon the stiffness of the liner to keep the bag open until the filling operation is performed. However, because of such variables as warp in liner material and size variations in cut material, these liners have a tendency to partially close prior to and during filling. The present method electrostatically pins the liner bag to the inside of the container and in the process opens said liner bags. Using electrostatic pinning to open the liner bag and further to maintain such liner bags in open disposition eliminates a troublesome variable in the filling procedure with less waste occurring during packaging.

It is therefore an object of this invention to provide an apparatus and method for electrostatically opening flexible liners stuffed in their containers and maintaining such liners in spread apart disposition prior to and during filling.

Another object of this invention is to provide an apparatus and method for electrostatically pinning flexible liners to the inside walls of their containers and opening the liner bags in the process prior to filling.

Still another object of this invention is to provide an electrostatic apparatus and method for opening flexible liner bags contained within cartons or boxes preparatory to filling the liner bags and maintaining said liner bags in spaced apart disposition during filling while keeping the total package electrostatically neutral at completion of operations.

Yet another object of this invention is to provide an electrostatic apparatus and method for electrostatically pinning flexible liner bags to the interior walls of a container by directing a stream of ions of a single polarity (D.C. negative or D.C. positive ions) toward the bag while symmetrically directing a stream of A.C. ions of both polarities toward the outside of the container thereby causing an electric field to be developed between a D.C. charging bar emitting the single polarity ions and an A.C. static bar emitting the dual polarity ions whereby an ion wind is produced that drives the D.C. charges deep into the liner bag for efficacious pinning.

Other objects of this invention are to provide an improved device and method of the character described which is easily and economically produced, sturdy in construction and both highly efficient and effective in operation.

SUMMARY OF THE INVENTION

In accordance with the present invention, there is provided and electrostatic apparatus and method for opening flexible liners within container cartons and maintaining such liners in spread apart disposition prior to and during filling, said apparatus and method comprising (1) a pair of facing A.C. static bars having pointed discharge electrodes coupled to an A.C. high voltage power supply and directing a stream of bipolar ions (both positive and negative) symmetrically with respect to the exterior walls of the container, and (2) a D.C. charging bar having pointed discharge electrodes coupled to a D.C. high voltage power supply and directing a stream ions of a single polarity toward the mouth of the liner. An electric field is developed between the D.C. charging bar and the two A.C. static bars emitting dual polarity ions to create a force on the preferably negative unipolar ions generated by the charging bar. The electric field from the D.C. charging bar and the accumulating (negative) charges on liner bag causes positive charges from the bipolar air ions to deposit upon the outside walls of the container. The accumulation of opposite polarity charges on the container and the liner bag causes electrostatic attraction between the liner bag and its enclosing container thereby opening the bag in the process.

An ion wind is produced by the pointed discharge electrodes of the D.C. charging bar which transports the D.C. ions emitted therefrom deep into the container for more efficacious pinning. The placement of the two A.C. static bars symmetrically with respect to the centerline of the container is crucial to establishing the ion wind. The directing of the A.C. bipolar ions toward the outside of the container enables the total package to be substantially neutralized electrostatically as it leaves the process, even though the liner and the container are oppositely charged. The D.C. generated voltage output to the D.C. charging bar and the A.C. generated output to the bipolar ionizing bars may be 180° out-of-phase to enable the D.C. output from the charging bar to be at maximum voltage from the charging bar when the A.C. supply is creating opposite polarity ions in order to maximize electrostatic pinning.

BRIEF DESCRIPTION OF THE DRAWINGS

With the above and related objects in view, this invention consists of the details of construction and combination of parts as will be more fully understood from the following detailed description when read in conjunction with the accompanying drawing in which:

FIG. 1 is a perspective view of an apparatus for electrostatically opening container liner bags as embodied in this invention.

FIG. 2 is a side cross-sectional view of the container and liner bags thereof and showing the electrical field lines created by the apparatus of this invention.

FIG. 3 is a side cross-sectional view showing the manner in which the electrostatic charges are induced on the liner bag and the container prior to electrostatic pinning.

FIG. 4 is a side cross-sectional view of the electrostatic charge relationship on the liner bag and its container after electrostatic pinning.

DETAILED DESCRIPTION

Figure 5:
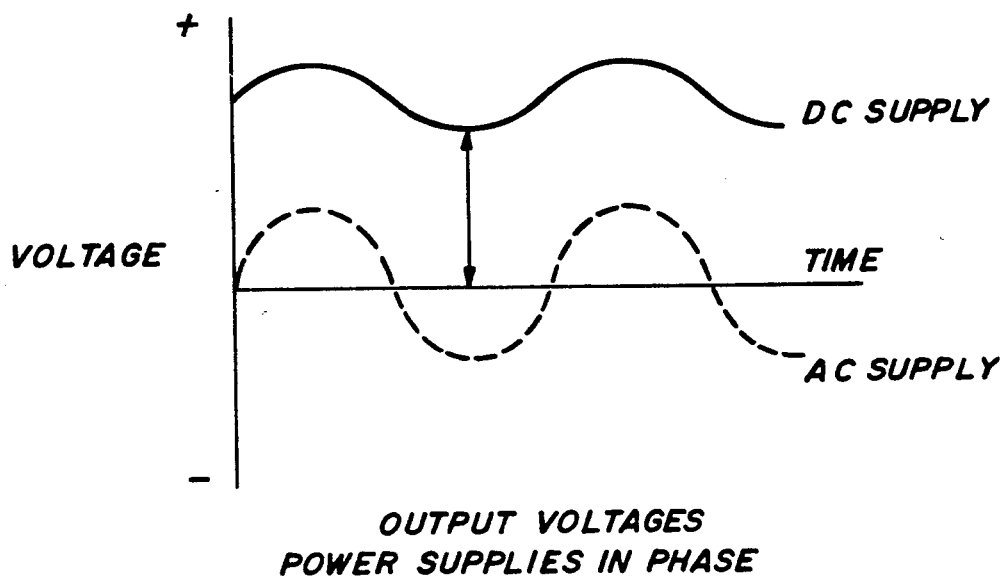
FIG. 5 is a voltage output versus time curve for both the D.C. and A.C. supply voltages when in phase with each other.

Referring now in greater detail to the drawings in which similar reference characters refer to similar parts, there is shown in FIG. 1 an electrostatic apparatus for opening liner bags 10 while inserted within a container 12 and comprising a pair of A.C. static bars A1 and A2 facing toward opposite exterior surfaces 14 and 16 of such containers. The liner bags 10 may be of waxed paper or polyethylene for example, and the containers may be conventional paperboard boxes, both the liners and the containers being of insulative material. The mouth 10A of the liner bag 10 faces upwardly during the filling operation, and, of course, the upper end 12A of the container or carton 12 is similarly open to expose the liner bag 10. A charging bar B directs ions of a single polarity toward the mouth 10A of the liner bag 10.

Each of the static bars A1 and A2 comprises a longitudinally extending insulated block 20 made of a suitable dielectric material such as polystyrene and having an insulated cable 22 passing through a axially extending bore 24 therein. Longitudinally spaced pointed needles 26 which act as discharge electrodes project through apertures in the block 20 into electrical contact with a central conductor 28 of the cable 22. The pointed discharge electrodes 26 are formed of a suitable conductor, such as brass or steel. The points 26 are connected to the high side of a high voltage A.C. power generator G by way of the central conductor 28 while the low side of the generator G is connected to ground. A grounded conductive casing 30 which encloses the back and two sides of the blocks 20 of both static bars A1 and A2 so that the high voltage gap between the edges of the casing 30 and the points 26 causes the emission of both positive and negative ions across the gap and exposes any articles adjacent the points to bipolar ions.

The static bars A1 and A2 are symmetrically disposed on opposite sides of the container 12 to enable the ion emission impinging upon the container 12 to be substantially equal on opposite exterior walls 14 and 16 thereof. A second pair of static bars A1' and A2' vertically disposed with respect to the static bars A1 and A2 act in conjunction therewith as the carton 12 passes through the four static bars symmetrically, as shown in FIG. 1. The symmetrical placement of the container 12 with respect to the A.C. static bars is crucial to establishing an ion wind created by the static discharge bar B deep into the liner 10. The static bars A1' and A2' are connected to the static bars A1 and A2 via cable 22' and are in all respects substantially identical thereto.

The charging bar B comprises an elongated rod (not shown) supported axially within a non-conductive housing 32 and having conductive discharge points 34 projecting outwardly from the rod into a gap of the housing 32. The discharge points 34 are connected to a high voltage D.C. power unit D via insulated cable 36 and its central conductor 38 whereby a stream of D.C. ions are caused to be emitted from the points 34 toward the mouth 10A of the liner bag 10. While the ion emission is preferably negative because of the greater mobility of negative ions, the ions created in the air gap and directed toward the liner 10 may be of either polarity.

Referring next to FIG. 2, an electric field is created between the D.C. charging bar B and the two static bars A1 and A2, the electric field producing a force on the negative ions generated by the charging bar B. The force is predominantly in the downward direction. This causes the majority of these negative ions to travel down into the box 12 and charge the liner bag 10.

Referring next to FIG. 3, the electric field from the charging bar B and the accumulating negative charges on the liner bag 10 cause positive ions from the bipolar ion emission to deposit on the outside of the container 12.

As shown in FIG. 3, pursuant to the accumulation of opposite polarity(+) ions on the container 12 and those on the liner bag(−), there is effected an electrostatic attraction between the two causing the liner bag 10 to be drawn into the container 12 with consequent opening of the liner in the process.

The placement of the two static bars A1 and A2 symmetrically about the centerline of the carton 12 (and the points 34 of the charging bar B) produces an ion wind that drives the charges deep into the container 12 for more effective electrostatic pinning.

Although the carton walls 12 are charged positively, the liners 10 become charged to the opposite polarity whereby the charges on the opposing surfaces neutralize one another. Since the outside of the containers 12 are exposed to ions of both polarities by virtue of the bipolar emission from the static bars A1 and A2, the overall or total charge on the cartons is effectively zero or neutral.

Figure 6:
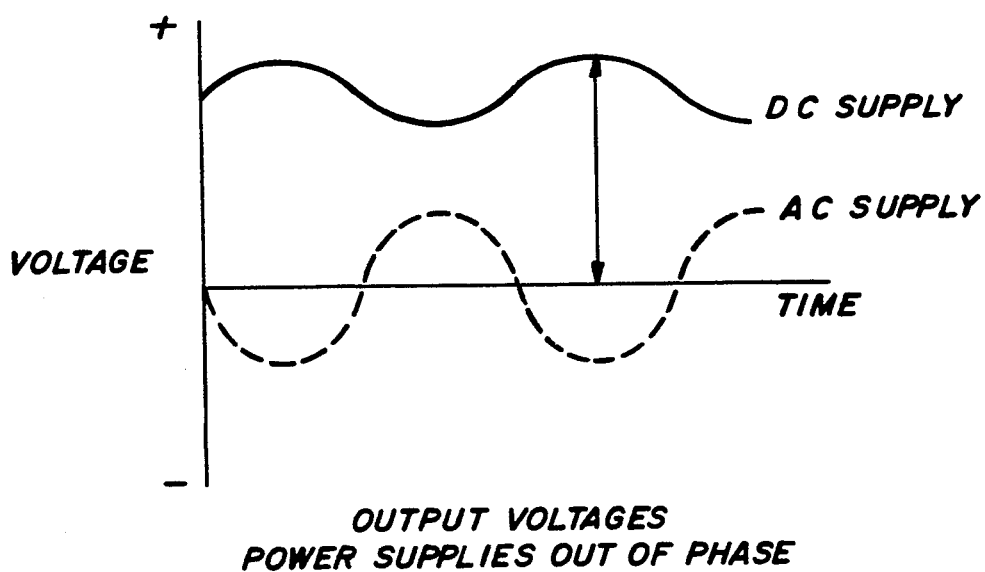
FIG. 6 is a voltage output versus time curve for both the D.C. and A.C. supply voltages when 180° out-of-phase with each other.

Referring next to FIGS. 5 and 6, there is shown an improvement to the phase energizing D.C. and A.C. supply systems. In particular, D.C. power supply units D used for charging applications typically have crude filtering on the output side of the generators such that ripples appear on the high voltage driving the charging bars B.

When the power supplies D and G are in phase as shown in FIG. 5, the D.C. supply is at minimum voltage when the A.C. supply G is creating opposite polarity ions. However, the D.C. supply D is at maximum voltage when the A.C. supply voltage G is creating opposite polarity ions. See FIG. 6. This out-of-phase arrangement maximizes pinning provided that the D.C. supplies do not have well filtered outputs or do not operate at line frequencies.

Although this invention has been described in considerable detail, such description is intended as being illustrative rather than limiting, since the invention may be variously embodied without departing from the spirit thereof and the scope of the invention is to be determined as claimed.

What is claimed is:

1. A method for opening liners of containers in order to maintain the liners in spread apart open disposition prior to filling, comprising,
    (a) placing a partially open liner in an open container with the upper end of each facing upwardly,
    (b) directing a stream of A.C. air ions toward opposing outside walls of the container,
    (c) directing a stream of D.C. air ions toward the partially open liner so that the interior surfaces of the liner will become charged opposite to the charge on the walls of the container and effect electrostatic adhesion of the walls of the liner to the walls of the container and in spread apart disposition against the walls of the container.

2. The method of claim 1 wherein the streams of A.C. air ions are symmetrically directed in oppositely facing directions.

3. The method of claim 2 wherein the D.C. air ions have a voltage 180° out-of-phase with that of the A C. air ions.

4. Apparatus for opening liners while inserted within open boxes preparatory to filling, comprising:
    (a) A.C. electrostatic ionizing means for directing a stream of bipolar ions toward the outer walls of said box,
    (b) D.C. electrostatic charging means for directing an ion wind of a single polarity toward the interior of the liner while the mouth of the liner and the box face upwardly whereby the box and the liner will be charged to opposite polarities and cause the liner to be electrostatically pinned in the open disposition to the interior of the box.

5. The apparatus of claim 4 wherein the A.C. electrostatic ionizing means comprises a pair of static bars symmetrically disposed with respect to the outer walls of the box.

6. The apparatus of claim 5 wherein the static bars include pointed discharge electrodes coupled to an A.C. high voltage power supply.

7. The apparatus of claim 6 wherein the D.C. electrostatic ionizing means comprising a charging bar having discharge electrodes coupled to a D.C. high voltage power supply.

8. The apparatus of claim 7 wherein the voltage of the A.C. power supply to the discharge points of the A.C. electrostatic ionizing means is 180° out of phase with the voltage of the D.C. power supply to the discharge points of the D.C. electrostatic ionizing means.

* * * * *